(12) United States Patent
Hamada

(10) Patent No.: US 8,980,776 B2
(45) Date of Patent: Mar. 17, 2015

(54) LEAD-FREE LOW MELTING POINT GLASS COMPOSITION

(75) Inventor: Jun Hamada, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/642,033

(22) PCT Filed: Jun. 9, 2011

(86) PCT No.: PCT/JP2011/063198
§ 371 (c)(1),
(2), (4) Date: Oct. 18, 2012

(87) PCT Pub. No.: WO2012/002120
PCT Pub. Date: Jan. 5, 2012

(65) Prior Publication Data
US 2013/0090226 A1 Apr. 11, 2013

(30) Foreign Application Priority Data
Jun. 29, 2010 (JP) ................................. 2010-147805

(51) Int. Cl.
| | | |
|---|---|---|
| C03C 8/24 | (2006.01) | |
| C03C 8/14 | (2006.01) | |
| C03C 3/145 | (2006.01) | |
| C03C 3/066 | (2006.01) | |
| H01J 5/04 | (2006.01) | |
| H01J 5/24 | (2006.01) | |
| H01J 11/38 | (2012.01) | |
| H01J 11/48 | (2012.01) | |
| H01J 29/86 | (2006.01) | |
| H01J 61/30 | (2006.01) | |
| G02F 1/1333 | (2006.01) | |

(52) U.S. Cl.
CPC .................. *C03C 3/145* (2013.01); *C03C 3/066* (2013.01); *C03C 8/24* (2013.01); *H01J 5/04* (2013.01); *H01J 5/24* (2013.01); *H01J 11/38* (2013.01); *H01J 11/48* (2013.01); *H01J 29/863* (2013.01); *H01J 61/302* (2013.01); *G02F 2001/133302* (2013.01); *G02F 2202/09* (2013.01); *G02F 2203/68* (2013.01)
USPC ................... 501/15; 501/14; 501/17; 501/21; 501/26; 501/52

(58) Field of Classification Search
CPC .............. C03C 8/00; C03C 8/02; C03C 8/04; C03C 8/14; C03C 8/24; C03C 3/12; C03C 3/14; C03C 3/145; C03C 3/064; C03C 3/066; C03C 3/122
USPC ........... 501/14, 15, 17, 21, 26, 41, 49, 52, 77, 501/79
See application file for complete search history.

(56) References Cited

U.S. PATENT DOCUMENTS

| | | | |
|---|---|---|---|
| 6,635,193 B1 | 10/2003 | Fukushima et al. | |
| 7,138,076 B2 | 11/2006 | Fukushima et al. | |
| 7,291,573 B2 * | 11/2007 | Ide | ................................. 501/50 |
| 7,556,748 B2 * | 7/2009 | Wang et al. | .................. 252/514 |
| 8,685,506 B2 * | 4/2014 | Masuda et al. | ............... 428/34.4 |
| 2012/0325311 A1 * | 12/2012 | Yamada et al. | ............... 136/256 |

FOREIGN PATENT DOCUMENTS

| | | |
|---|---|---|
| JP | 9-227214 A | 9/1997 |
| JP | 2000-219536 A | 8/2000 |
| JP | 2001-52621 A | 2/2001 |
| JP | 2007-186395 A | 7/2007 |
| JP | 2007-210870 A | 8/2007 |
| JP | 2009-155200 A | 7/2009 |
| WO | WO 2009128527 A1 * | 10/2009 |
| WO | WO 2011019006 A1 * | 2/2011 |

OTHER PUBLICATIONS

Machine Translation of JP 2009-155200 A Jul. 16, 2009.*
Machine Translation of JP 2007-210870 A Aug. 23, 2007.*
Taiwanese Office Action dated Jul. 31, 2013 (four (4) pages).
International Search Report with English translation dated Jul. 12, 2011 (three (3) pages).
Form PCT/ISA/237 (three (3) pages), Jul. 12, 2011.
Taiwanese Office Action dated Jun. 5, 2014 (three (3) pages).

\* cited by examiner

*Primary Examiner* — Anthony J Green
*Assistant Examiner* — Elizabeth A Bolden
(74) *Attorney, Agent, or Firm* — Crowell & Moring LLP

(57) ABSTRACT

Disclosed is a lead-free, low melting point glass composition, which is characterized by being substantially free from a lead component and comprising 0-8 mass % of $SiO_2$, 2-12 mass % of $B_2O_3$, 2-7 mass % of ZnO, 0.5-3 mass % of RO (MgO+ CaO+SrO+BaO), 0.5-5 mass % of CuO, 80-90 mass % of $Bi_2O_3$, 0.1-3 mass % of $Fe_2O_3$, and 0.1-3 mass % of $Al_2O_3$. This glass composition is not easily crystallized at high temperatures and is stable. Therefore, it is useful as an insulating coating material and a sealing material for electronic material substrates.

4 Claims, No Drawings

LEAD-FREE LOW MELTING POINT GLASS COMPOSITION

TECHNICAL FIELD

The present invention relates to a lead-free, low-melting-point glass composition, which is used as an insulating coating material and a sealing material for electronic material substrates represented by plasma display panel (PDP), liquid-crystal display panel, electroluminescence panel, fluorescence display panel, electrochromic display panel, light-emitting diode display panel, gas discharge type display panel, etc.

BACKGROUND OF THE INVENTION

Hitherto, glass has been used as an adhesive or sealing material of electronic parts, or as a covering material for protecting and insulating electrodes and resistors formed in electronic parts. In particular, along with the development of electronic parts in recent years, many types of display panels have been developed, such as plasma display panel, liquid-crystal display panel, electroluminescence panel, fluorescence display panel, electrochromic display panel, light-emitting diode display panel, gas discharge type display panel, etc.

The glass used for these is required, according to its use, to have various characteristics, such as chemical durability, mechanical strength, fluidity, electric insulation property, etc. In particular, in the case of using it as a sealing material, fluidity at low temperatures is mentioned as an important factor. In case that fluidity is insufficient, there is a risk of leak out of a sealed portion. With this, it is not possible to obtain characteristics required as display panels. Therefore, in any use, there is widely used a low melting point glass containing a large amount of PbO, which has a tremendous effect of lowering melting point of glass (for example, see Patent Publication 1).

PbO, however, has a harmful effect on human body and the environment. In recent years, there is a tendency to avoid its use, and it is under consideration to make electronic materials, such as PDP, free of lead (for example, see Patent Publication 2 and Patent Publication 3).

PRIOR ART PUBLICATIONS

Patent Publications

Patent Publication 1: Japanese Patent Application Publication 2001-52621.
Patent Publication 2: Japanese Patent Application Publication 2000-219536.
Patent Publication 3: Japanese Patent Application Publication Heisei 9-227214.

SUMMARY OF THE INVENTION

Although lead component is an important component for making glass have low melting points, it has a harmful effect on human body and the environment. Thus, in recent years, there is a tendency to avoid its use, and a lead-free glass is requested in electronic materials, such as PDP.

In lead-free compositions as alternatives to PbO series, many of those glasses are unstable. In case that they are treated at high temperatures, they are crystallized during baking. With this, it is not possible to sufficiently fulfill their function.

That is, the above-mentioned Japanese Patent Application Publication 2001-52621 has a basic problem of containing lead, although advantageous effects of a low melting point glass are recognized.

Furthermore, those of the above-mentioned Japanese Patent Application Publication 2000-219536 and the above-mentioned Japanese Patent Application Publication Heisei 9-227214 do not contain lead, but are unstable glasses. In case that they are treated at high temperatures, they are crystallized during baking. With this, it is not possible to sufficiently fulfill their function.

According to the present invention, there is provided a lead-free, low melting point glass composition (a first glass composition), which is characterized by being substantially free from a lead component and comprising 0-8 mass % of $SiO_2$, 2-12 mass % of $B_2O_3$, 2-7 mass % of ZnO, 0.5-3 mass % of RO (MgO+CaO+SrO+BaO), 0.5-5 mass % of CuO, 80-90 mass % of $Bi_2O_3$, 0.1-3 mass % of $Fe_2O_3$, and 0.1-3 mass % of $Al_2O_3$.

The first glass composition may be a lead-free, low melting point glass composition (a second glass composition), which is characterized by comprising 1-40 mass % of a refractory filler.

Furthermore, according to the present invention, there is provided a substrate for electronic materials, which is characterized by using the first or second glass composition.

Furthermore, according to the present invention, there is provided a display panel, which is characterized by using the first or second glass composition.

Advantageous Effect of the Invention

According to the present invention, it is possible to obtain a stable, lead-free, low melting point glass composition, which is not easily crystallized at high temperatures, in electronic materials represented by plasma display panel, liquid-crystal display panel, electroluminescence panel, fluorescence display panel, electrochromic display panel, light-emitting diode display panel, gas discharge type display panel, etc. Furthermore, since it is substantially free from a lead component, there is no harmful effect on human body and the environment.

DETAILED DESCRIPTION

The present invention provides a lead-free, low melting point glass composition, which is characterized by comprising 0-8 mass % of $SiO_2$, 2-12 mass % of $B_2O_3$, 2-7 mass % of ZnO, 0.5-3 mass % of RO (MgO+CaO+SrO+BaO), 0.5-5 mass % of CuO, 80-90 mass % of $Bi_2O_3$, 0.1-3 mass % of $Fe_2O_3$, and 0.1-3 mass % of $Al_2O_3$.

This glass composition may contain 1-40 mass % of a refractory filler, based on 100 mass % of the total of the above glass components.

$SiO_2$ is a glass forming component. By a coexistence with $B_2O_3$ as another glass forming component, it is possible to form a stable glass. It is contained in a range of 0-8% (mass %, it is the same in the following). If it exceeds 8%, softening point of glass increases. This makes formability and workability difficult. More preferably, it is in a range of 0-4%.

$B_2O_3$ is a glass forming component. It makes glass melting easy, suppresses an excessive increase in thermal expansion coefficient of glass, provides the glass with a suitable fluidity upon baking, and lowers dielectric constant of the glass. It is contained in the glass preferably in a range of 2-12%. If it is less than 2%, fluidity of the glass becomes insufficient to impair sinterability. On the other hand, if it exceeds 12%, softening point of the glass increases to make formability and workability difficult. More preferably, it is in a range of 4-8%.

ZnO lowers softening point of the glass and adjusts thermal expansion coefficient to being in a suitable range. It is contained in the glass in a range of 2-7%. If it is less than 2%, the above action is not fulfilled. If it exceeds 7%, the glass becomes unstable and tends to cause devitrification. More preferably, it is in a range of 3-7%.

RO (MgO+CaO+SrO+BaO) lowers softening point of the glass, gives a suitable fluidity, and adjusts thermal expansion coefficient to being in a suitable range. It is contained in a range of 0.5-3%. If it exceeds 3%, thermal expansion coefficient becomes too high. More preferably, it is in a range of 1-3%.

CuO suppresses devitrification of the glass at the time of melting or at the time of baking. It is contained in a range of 0.5-5%. Exceeding 5% lowers stability of the glass. More preferably, it is in a range of 1-3%.

$Bi_2O_3$ lowers softening point of the glass, gives a suitable fluidity, and adjusts thermal expansion coefficient to being in a suitable range. It is desirable to be contained in a range of 80-90%. If it is less than 80%, the above action is not fulfilled. If it exceeds 90%, thermal expansion coefficient becomes too high. More preferably, it is in a range of 83-88%.

$Fe_2O_3$ suppresses devitrification of the glass at the time of melting or at the time of baking. It is contained in a range of 0.1-3%. Exceeding 3% lowers stability of the glass. More preferably, it is in a range of 0.1-2%.

$Al_2O_3$ suppresses devitrification of the glass at the time of melting or at the time of baking. It is contained in a range of 0.1-3%. Exceeding 3% lowers stability of the glass. More preferably, it is in a range of 0.1-2%.

Besides, it is optional to suitably add $In_2O_3$, $TiO_2$, $SnO_2$, $TeO_2$, etc., which are represented in the form of common oxides, to the extent that the above properties are not impaired.

By being substantially free from PbO, it is possible to make the influences on human body and the environment nil. Herein, being substantially free from PbO means the amount to the extent that the glass raw material is contaminated with PbO as an impurity. For example, if it is in a range of 0.3 mass % or less in the low melting point glass, the above-mentioned harmful influences, that is, the influences on human body and the environment and the influences on insulation characteristics, etc. do almost not exist, and it is substantially free from the influence of PbO.

Furthermore, it is also optional to add 1-40 mass % of a refractory filler relative to 100 mass % of the total of the above glass components. By containing the refractory filler, it is possible to adjust thermal expansion coefficient. Furthermore, it becomes possible to improve mechanical strength. If it is over 40 mass %, fluidity as a sealing material lowers, thereby causing a leak. Preferably, it is in a range of 3-20%.

As the refractory filler, it is possible to use cordierite, β-eucryptite, zircon, mullite, alumina, etc.

The lead-free, low melting point glass composition of the present invention can preferably be used for substrates for electronic materials and display panels.

In many cases, the lead-free, low melting point glass composition of the present invention is used in the form of powder. In general, this powdered glass is, according to need, mixed with a refractory filler, a heat-resistant pigment, or the like, followed by kneading with an organic oil to produce a paste.

As the glass substrate, a transparent glass substrate, particularly a soda-lime-silica glass, or a similar glass (a high strain point glass), or an alumino-lime-borosilicate glass that is low (or almost zero) in alkali components, is frequently used.

EXAMPLES

In the following, it is explained based on examples.

Firstly, as to the glass powder, a raw material batch is prepared by weighing and mixing a variety of inorganic raw materials to have a predetermined composition described in examples. This raw material batch was introduced into a platinum crucible, followed by melting through heating at 1000-1300° C. for 1-2 hours in an electric heating furnace to obtain a glass having a composition shown in Examples 1-7 of Table 1 and Comparative Examples 1-4 of Table 2. A portion of the glass was poured into a mold to have a block shape to be used for measuring thermal properties (thermal expansion coefficient and softening point). The remaining glass was formed into flakes with a rapid-cooling, dual roll former, and they were subjected to sizing with a grinder into a powder having an average grain size of 1-4 μm and a maximum grain size of less than 10 μm.

Softening point was measured by a thermal analyzer TG-DTA (made by Rigaku Corporation). Furthermore, thermal expansion coefficient was determined from an elongation at 30-300° C. using a thermal dilatometer when the temperature was increased at 5° C./minute.

The obtained glass powder was pressed into a cylindrical shape of 10 mm×10 mmϕ by using a hand press machine, followed by a baking at 450° C. for 30 minutes. Furthermore, as a refractory filler, β-eucryptite powder was mixed at a predetermined proportion, and then similarly a pressed compact was baked at 450° C. for 30 minutes.

The degree of extension after baking of the pressed compact is closely related with the degree of crystallization and fluidity of the glass. One sufficiently extended after the baking was judged as O (high in fluidity). One insufficient in extension was judged as x (low in fluidity).

(Results)

The low melting point glass compositions and a variety of test results are shown in tables.

TABLE 1

| Example | | 1 | 2 | 3 | 4 | 5 | 6 | 7 |
|---|---|---|---|---|---|---|---|---|
| Glass composition [wt %] | $SiO_2$ | 6.0 | 1.2 | | | 3.0 | | |
| | $B_2O_3$ | 4.4 | 6.8 | 11.0 | 2.4 | 3.4 | 5.4 | 3.1 |
| | ZnO | 5.0 | 2.5 | 2.7 | 6.3 | 4.9 | 5.9 | 3.0 |
| | MgO | | 0.5 | | | | | |
| | CaO | | | | 0.5 | | 0.8 | |
| | SrO | | 1.3 | 2.1 | | | | |
| | BaO | 1.0 | | | 1.0 | | 1.0 | 1.0 |
| | CuO | 1.7 | 1.7 | 1.4 | 1.0 | 4.2 | 1.7 | 3.0 |
| | $Bi_2O_3$ | 81.0 | 83.0 | 81.0 | 85.7 | 82.8 | 85.1 | 88.5 |
| | $Fe_2O_3$ | 0.4 | 2.8 | 0.2 | 1.0 | 0.4 | 0.4 | 0.9 |
| | $Al_2O_3$ | 0.5 | 0.2 | 1.1 | 2.6 | 0.5 | 0.5 | 0.5 |

TABLE 1-continued

| Example | | 1 | 2 | 3 | 4 | 5 | 6 | 7 |
|---|---|---|---|---|---|---|---|---|
| Thermal expansion coef. | ×10⁻⁷/° C. | 102 | 107 | 101 | 113 | 108 | 115 | 119 |
| Softening point | ° C. | 408 | 398 | 415 | 395 | 410 | 390 | 385 |
| Ceramics filler | β-eucryptite | — | — | — | — | 5 | 15 | 30 |
| 450° C fluidity | | ○ | ○ | ○ | ○ | ○ | ○ | ○ |

TABLE 2

| Comparative Example | | 1 | 2 | 3 | 4 |
|---|---|---|---|---|---|
| Glass composition [wt %] | $SiO_2$ | | | 0.8 | 1.1 |
| | $B_2O_3$ | 1.1 | 13.0 | 4.2 | 12.5 |
| | ZnO | 4.3 | 10.7 | 8.0 | 7.4 |
| | MgO | | | | |
| | CaO | | 1.0 | | |
| | SrO | | | | |
| | BaO | 1.2 | | 1.0 | |
| | CuO | 1.4 | 1.2 | | |
| | $Bi_2O_3$ | 92.0 | 74.0 | 86.0 | 78.5 |
| | $Fe_2O_3$ | | 0.1 | | 0.3 |
| | $Al_2O_3$ | | | | 0.2 |
| Thermal expansion coef. | ×10⁻⁷/° C. | — | 95 | 114 | 95 |
| Softening point | ° C. | — | 440 | 395 | 440 |
| Ceramics filler | β-eucryptite | — | — | — | 50 |
| 450° C. fluidity | | — | x | x | x |
| Notes | | Crystallized | High softening point | Crystallization tendency | Insufficient sintering |

As shown in Examples 1-7 in Table 1, within the compositional range of the present invention, the degree of crystallization is low, and fluidity is high. That is, it is suitable as a sealing material for electronic material substrates and display panels.

On the other hand, Comparative Examples 1-4 in Table 2, which are out of the compositional range of the present invention, are striking in crystallization upon the baking or do not show suitable material values. Therefore, they cannot be applied as a sealing material.

The invention claimed is:

1. A lead-free, low melting point glass composition, which is characterized by being substantially free from a lead component and comprising a glass component consisting essentially of 0-8 mass % of $SiO_2$, 2-12 mass % of $B_2O_3$, 0.1-3 mass % of $Al_2O_3$, 2-7 mass % of ZnO, 0.5-3 mass % of RO (total of MgO, CaO, SrO and BaO), 0.5-5 mass % of CuO, 80-90 mass % of $Bi_2O_3$, and 0.1-3 mass % of $Fe_2O_3$.

2. The lead-free, low melting point glass composition according to claim 1, further comprising 1-40 mass % of a refractory filler relative to 100 mass % of the glass component.

3. A substrate for electronic materials, comprising:
an insulating coating material and a sealing material of the substrate
wherein the insulating coating material and/or the sealing material of the substrate is the lead-free, low melting point glass composition according to claim 1.

4. A display panel, comprising:
an insulating coating material and a sealing material of the display panel
wherein the insulating coating material and/or the sealing material of the display panel is the lead-free, low melting point glass composition according to claim 1.

* * * * *